United States Patent
Heller

(10) Patent No.: US 6,723,256 B1
(45) Date of Patent: Apr. 20, 2004

(54) AQUEOUS COMPOSITIONS OF A UV-ACTIVE AGENTS, THEIR PRODUCTION AND USE

(75) Inventor: Jürg Heller, Oberwil (CH)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 09/763,506

(22) PCT Filed: Aug. 24, 1999

(86) PCT No.: PCT/IB99/01466

§ 371 (c)(1),
(2), (4) Date: Feb. 23, 2001

(87) PCT Pub. No.: WO00/11256

PCT Pub. Date: Mar. 2, 2000

(30) Foreign Application Priority Data

Aug. 25, 1998 (EP) .............................................. 98810840
Jun. 1, 1999 (EP) .............................................. 99810474

(51) Int. Cl.⁷ ................................................ C09K 11/06
(52) U.S. Cl. ........................ 252/301.21; 252/589; 8/648
(58) Field of Search ............................ 252/301.21, 589; 8/648

(56) References Cited

U.S. PATENT DOCUMENTS

| | | | | |
|---|---|---|---|---|
| 4,752,298 A | * | 6/1988 | Burglin et al. .................. | 8/527 |
| 4,940,469 A | | 7/1990 | Mockel et al. .................. | 8/527 |
| 5,053,055 A | * | 10/1991 | Fringeli et al. ................. | 8/648 |
| 5,575,958 A | * | 11/1996 | Jollenbeck et al. ............. | 8/566 |

FOREIGN PATENT DOCUMENTS

| | | | |
|---|---|---|---|
| EP | 0 044 995 | | 2/1982 |
| EP | 0 225 287 | | 6/1987 |
| EP | 0 321 393 | | 6/1989 |
| EP | 0 328 485 | | 8/1989 |
| EP | 0 468 921 | | 1/1992 |
| EP | 0 474 595 | | 3/1992 |
| EP | 0 490 819 | | 6/1992 |
| GB | 2041011 | * | 9/1980 |

OTHER PUBLICATIONS

English abstract for EP 0044995, Feb. 3, 1982.
English abstract for EP 0474595, Mar. 11, 1992.
English abstract for EP 0490819, Jun. 17, 1992.

* cited by examiner

Primary Examiner—Peter Szekely
(74) Attorney, Agent, or Firm—Scott E. Hanf

(57) ABSTRACT

Aqueous dispersions (U) containing:
    (A) a UV-light-absorbing textile treatment agent and
    (B) a dispersant system containing
        ($B_X$) a non-ionogenic, polymeric, hydrophilic dispersant or a mixture of such dispersants and
        ($B_Y$) a non-ionogenic or anionic, vinyl-polymeric, hydrophilic thickener or a mixture of such thickeners, and optionally at least one of the following further components:
    ($B_Z$) at least one non-ionogenic or anionic surfactant other than ($B_X$)
    ($B_W$) at least one dispersing auxiliary other than ($B_Y$).
    (C) by-products and/or concomitants
    (D) at least one formulation additive and
    (E) at least one agent for setting the pH are particularly stable and are very useful for the UV-active finishing of textile material.

12 Claims, No Drawings

AQUEOUS COMPOSITIONS OF A UV-ACTIVE AGENTS, THEIR PRODUCTION AND USE

BACKGROUND OF THE INVENTION

Textile material which is used in an environment in which ultraviolet (UV) light acts on the textile material, especially UV light filtering through glass, as for the interior fittings in automobiles (carpets, belts, trim and seat covers), shop windows or glass-enclosed verandas (wall-to-wall carpets), are advantageously finished with a UV absorber in order that the fibres, especially synthetic and semisynthetic fibres, and the dyeings too to some extent, may be protected against the damaging action of the UV rays. A preferred procedure for textile material used in an environment with filtered UV light involves applying the UV absorbers to the substrate, in particular to the fabrics or to the yarns, together with the respective dyes. Examples of technically preferred methods are batch methods, very particularly those in which the treatment liquors are subjected to a pronounced dynamic stress, for example for piece goods (particularly in rope or tube form) the dyeing in jet dyeing machines or for yarns the dyeing in the form of cheeses, or continuous methods whereby, for example, the impregnated fabrics are subjected to rapid thermal fixing, particularly, for example, according to the thermosol processes. It is also desirable with these dyeing processes to apply the UV absorbers at the same time. However, when dyeing with a pronounced dynamic stress on the liquors, especially for example when dyeing cheeses with disperse dyes, in the presence of UV absorbers, a problem is that, in the presence of UV absorbers which have been formulated with surfactants, the liquors may, under the action of the high shearing forces which occur in the cheese, alter to such an extent that the dyeings of the cheeses become unlevel, in particular due to the dye being filtered off, so that the yarn when further processed, for example into knits or wovens, provides an unlevel appearance, or/and, if the dispersions change in their flow behaviour under the action of the high shearing forces, the liquor flow through the cheeses may gradually lead to a troublesome build-up of pressure, which—especially depending on yarn quality and type of wind—leads to correspondingly more pronounced changes to the shearing forces in the package and may even lead to a complete standstill of the flow of liquor through the package. Similar problems can arise when dyeing piece goods in jet dyeing machines if disperse dyes are used in the presence of UV absorbers. Impregnation processes with thermofixing, especially in the case of thermosol processes, can in the event of very rapid thermofixing in the presence of disperse dye and UV absorber also lead to a troublesome twosidedness if the action of heat on the substrate is not very uniform. The situation can be similar with the use of dispersed optical brighteners, even in the presence of shading dyes.

EP-A-468921, 474595 and 490819 describe certain aqueous UV-absorber dispersions containing UV-absorbers and anionic surface active compounds or non-ionogenic and anionic surface active compounds and also such dispersions additionally containing a polysaccharide or a linear polymeric compound as a stabiliser and/or thickening agent. EP-A-328485 describes aqueous dispersions of certain dyes, optical brighteners or UV-absorbers containing, besides dispersant, an alkylene-bisamide defoamer and in some examples also a linear polymer (polyvinyl alcohol or a propyleneoxide/ethyleneoxide 3000 blockpolyrner) or a polysaccharide. EP-A-44995 describes aqueous dispersions of optical brighteners containing a grafted polymer of certain vinylic monomers.

It has now been found, surprisingly, that by employing the hereinbelow-defined (B)-containing formulations, which contain a particular combination of polymeric auxiliaries, the above-described problems may be solved or avoided, so that it becomes possible as a result to apply the particular disperse dye and UV absorber liquors or disperse brightener liquors even under pronounced dynamic stress (for example in the jet or through cheeses) without fear of a troublesome pressure build-up or dye or brightener deposits in the cheeses or of troublesome dye or brightener separations in the jet or in the case of continuous impregnation processes, in the event of unlevel heating for the thermofixing step, and without an unlevel fabric appearance having to be feared as a result

SUMMARY OF THE INVENTION

The invention relates to the defined compositions, their production and their use.

From a first aspect, the invention accordingly provides aqueous flowable dispersions (U) containing:

(A) a UV-light-absorbing textile treatment agent and (B) a dispersant system containing ($B_X$) a non-ionogenic polymeric hydrophilic dispersant containing a polymeric lipophilic base structure and hydrophilic polyethylene glycol ether chains, or a mixture of such dispersants and ($B_Y$) anon-ionogenic or anionic vinyl-polymeric hydrophilic thickener or a mixture of such thickeners.

DESCRIPTION OF THE PREFERRED EMBODIMENTS

The UV-light-absorbing textile treatment agents (A) are UV-active agents, i.e. their fundamental property is the absorbing of UV light, whether to convert it at least partially into visible wavelengths, as in the case of optical brighteners, or to convert it at least partially into other energy forms or other wavelengths, as is the case with typical UV absorbers. Thus, the UV-active agents (A) are in particular ($A_1$) UV absorbers or ($A_2$) optical brighteners.

The UV-light-absorbing textile treatment agents (A) are in particular those which are dispersible in water in a manner known per se, i.e. with the aid of dispersants aqueous dispersions of (A) may be prepared which can then be used in accordance with the particular intended purpose.

Suitable UV absorbers ($A_1$) include generally known substances as are usually employed for the UV-absorbing finishing of synthetic and semisynthetic textile fibres from an aqueous dispersion, chiefly those of the benzophenone, triazine or benzotriazole series, in particular phenols which bear a substituent of the triazine, benzoyl or benzotriazole series in ortho-position relative to the hydroxyl group and which may bear further substituents, in particular non-chromophoric and non-water-solublilizing substituents.

Suitable UV absorbers of the benzophenone series include generally 2-bydroxybenzophenones in which the two benzene rings may optionally be substituted with substituents customary in UV absorbers in particular with non-chromophoric and non-water-solubilizing substituents, for example with hydroxyl, alkyl, alkoxy, aryl, aryloxy, aralkoxy or halogen, aryl (in aryl, aryloxy and aralkoxy) being naphthyl or preferably phenyl, the alkyl and alkoxy radicals containing for example 1 to 4 carbon atoms, phenyl as aryl optionally being further substituted with alkyl, halogen and/or alkoxy, and halogen signifying preferably chlorine, and the alkoxy bridge in aralkoxy containing e.g. 1 or 2 carbon atoms, There may be mentioned as examples 2-hydroxybenzophenones of the following formulae

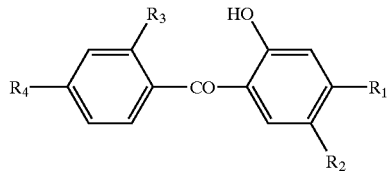

(I)

and

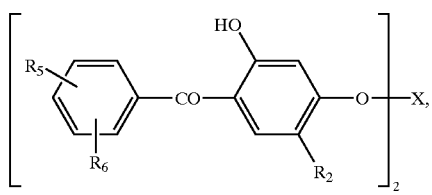

(II)

wherein $R_1$ signifies hydrogen, hydroxyl, phenoxy, aralkoxy or $C_{1-14}$-alkoxy, $R_2$ signifies hydrogen, halogen or $C_{1-4}$-alkyl, $R_3$ signifies hydrogen or hydroxyl, $R_4$ signifies hydrogen, hydroxyl, phenoxy, aralkoxy or $C_{1-4}$-alkoxy, $R_5$ signifies hydrogen or $C_{1-4}$-alkyl, $R_6$ signifies hydrogen or $C_{1-4}$-alkyl and X signifies a hydrocarbon bridge member having 2 to 12 carbon atoms or hydroxyalkylene.

In the compounds of the formula (1), $R_2$, $R_3$ and $R_4$ stand each preferably for hydrogen. $R_1$ preferably stands for hydrogen, hydroxyl, phenoxy or $C_{1-14}$-alkoxy.

In the formula (II), the two substituents $R_5$ and $R_6$ are advantageously in the positions ortho and para to the carbonyl group. Preferably, $R_5$ and also $R_6$ signify hydrogen. When X stands for hydroxyalkylene, it advantageously contains at least 3 carbon atoms and the hydroxyl group is advantageously not attached to the first or last carbon atom of the bridge. X may e.g. stand for 1,4-phenylene, 1,4-naphthylene or $C_{2-4}$-alkylene or also for 2-hydroxy-1,3-propylene.

The following may be mentioned in particular:

2-hydroxy-4-methoxybenzophenone, 2,4-dihydroxybenzophenone, 2-hydroxy-5-chlorobenzophenone, 1,3-bis-(3'-hydroxy-4'-benzophenoxy)-2-hydroxypropane.

Suitable UV-absorbers of the triazine series include in general 2-(2'-hydroxyphenyl)-s-triazines in which the positions 4 and 6 are substituted with hydrocarbon radicals which in turn may be further substituted, in which case the substituents are neither chromophoric nor water-solubilizing. The hydrocarbon radicals in 4-position and in 6-position are for example aryl, alkyl or aralkyl, aryl standing e.g. for naphthyl or preferably phenyl, aralkyl standing preferably for benzyl and alkyl containing e.g. 1 to 18 carbon atoms. The substituents occurring on phenyl rings are for example hydroxyl, halogen, low molecular weight alkyl, alkoxy or alkylthio, and the substituents occurring on the alkyl radicals are for example hydroxyl, low molecular weight alkoxy, alkylthio or dialkylamino. There may be mentioned for example the 2-(2'-hydroxyphenyl)-s-triazines of the following formula

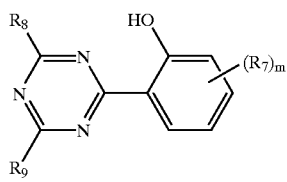

(III)

wherein $R_7$ signifies hydroxyl, halogen, $C_{1-4}$-alkyl or $C_{1-4}$-alkoxy, $R_8$ signifies $C_{1-18}$-alkyl, which is optionally substituted with hydroxyl, halogen, $C_{1-4}$-alkoxy, $C_{1-4}$-alkylthio or di-($C_{1-4}$-alkyl)-amino, or phenyl, which is optionally substituted with hydroxyl, halogen, $C_{1-4}$-alkyl or $C_{1-4}$-alkoxy, $R_9$ signifies $C_{1-18}$-alkyl, which is optionally substituted with hydroxyl, halogen, $C_{1-4}$-alkoxy, $C_{1-4}$-alkylthio or di-($C_{1-4}$-alkyl)-amino, or phenyl, which is optionally substituted with hydroxyl, halogen, $C_{1-4}$-alkyl or $C_{1-4}$-alkoxy, and m signifies 0, 1 or 2.

The alkyl radicals which occur may be linear or, if they contain three or more carbon atoms, may also be branched or, if they contain six or more carbon atoms, may also be cyclic.

$R_7$ stands preferably for chlorine or $C_{1-4}$-alkyl. When m signifies 2, the two $R_7$ substituents may have equal or different significances, in which latter case it is preferable for the second $R_7$ to signify methyl.

When m signifies 1 or 2, one $R_7$ is preferably in para-position relative to the 2-positioned hydroxyl group.

There may be mentioned in particular:

2-(2'-hydroxyphenyl)-s-triazine in which $R_8$ and $R_9$ have the same significance and signify each propyl or t.butyl, 4,6-dimethyl-2-(2'-hydroxy-5'-chloro-, -methyl- or -t.butyl-phenyl)-s-triazine, 4,6-dimethyl-2-(2'-hydroxy-4',5'- or -3',5'-dimethylphenyl)-s-triazine, 4,6-diethyl-2-(2'-hydroxy-4',5'-dimethylphenyl)-s-triazine, 4,6-diphenyl-2-(2'-hydroxy-4'-methoxy-, -ethoxy- or -isopropyl-phenyl)-s-triazine.

Suitable UV absorbers of the benzotriazole series include generally 2-(2'-hydroxyphenyl)-benzo-triazoles wherein the two benzene rings may optionally be substituted in particular with substituents customary in UV absorbers, in particular non-chromophoric and non-water-solubilizing substituents, e.g. hydroxyl, alkyl, alkoxy, aryl, aralkyl, alkylaryl, alkoxycarbonyl or halogen, aryl signifying naphthyl or preferably phenyl, the alkyl radicals containing for example from 1 to 12 carbon atoms, the alkoxy radicals containing for example from 1 to 4 carbon atoms, phenyl as aryl being optionally further substituted with halogen, $C_{1-4}$-alkyl and/or $C_{1-4}$-alkoxy and halogen standing preferably for chlorine. There may be mentioned e.g. 2-(2'-hydroxyphenyl)-benzotriazoles of the following formula

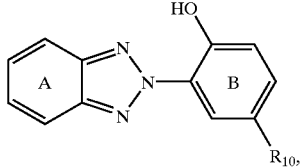

wherein
$R_{10}$ signifies $C_{1-12}$-alkyl, $C_{1-5}$-alkoxy, aryl, aralkyl, ($C_{1-12}$-alkyl)-aryl, ($C_{1-5}$-alkoxy)-carbonyl or halogen
and the rings A and B are each optionally substituted with one or more of the substituents hydroxyl, $C_{1-5}$-alkyl, $C_{1-5}$-alkoxy, $C_{1-5}$-alkoxycarbonyl or halogen, and B may also bear a $C_{1-12}$-alkyl radical in ortho position to the hydroxyl group.

The alkyl radicals which occur may be linear or, if they contain three or more carbon atoms, may also be branched or, if they contain six or more carbon atoms, may also be cyclic. Aralkyl stands preferably for benzyl. Halogen stands preferably for chlorine. In the ring B, the position 6 is preferably unsubstituted; in the benzotriazole ring, the positions 4 and 7 are preferably unsubstituted.

Preferred UV absorbers of the benzotriazole series conform to the formnula

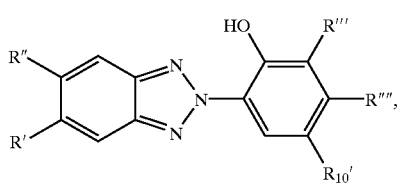

wherein
R' signifies hydrogen, $C_{1-5}$-alkyl, $C_{1-5}$-alkoxy, ($C_{1-5}$-alkoxy)-carbonyl or chlorine,
R" signifies hydrogen or chlorine,
R''' signifies hydrogen, $C_{1-12}$-alkyl, phenyl, ($C_{1-5}$-alkyl)-phenyl, benzyl or chlorine,
R'''' signifies hydrogen, hydroxyl, $C_{1-5}$-alkyl, $C_{1-5}$-alkoxy or chlorine, and $R_{10}'$ signifies $C_{1-12}$-alkyl, $C_{1-5}$-alkoxy, phenyl, ($C_{1-5}$-alkyl)-phenyl, benzyl, ($C_{1-5}$-alkoxy)-carbonyl or chlorine,
especially of the formula

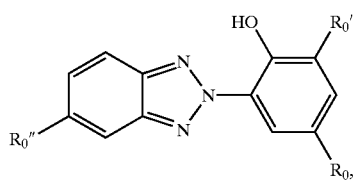

wherein
$R_0$ signifies $C_{1-5}$-alkyl, $C_{1-5}$-alkoxy or chlorine, preferably $C_{1-5}$-alkyl,
$R_0'$ signifies hydrogen, chlorine, $C_{1-5}$-alkyl or $C_{1-5}$-alkoxy, preferably hydrogen or $C_{1-5}$-alkyl, and
$R_0''$ signifies hydrogen, chlorine, $C_{1-5}$-alkyl or $C_{1-5}$-alkoxy, preferably hydrogen, chlorine or methyl.

There may be mentioned by way of example:
2-(2'-hydroxy-5'-methylphenyl)-benzotriazole,
2-(2'-hydroxy-3',5'-dimethylphenyl)-benzotriazole,
2-(2'-hydroxy-5'-t.butylphenyl)-benzotriazole,
2-(2'-hydroxy-3'-t.butyl-5'-methylphenyl)-5-chlorobenzotriazole,
2-(2'-hydroxy-3',5'-di-t.butylphenyl)-benzotriazole,
2-(2'-hydroxy-3',5'-di-t.butylphenyl)-5-chlorotriazole,
2'-(2'-hydroxy-3',5'-di-t-amylphenyl)-benzotriazole.

Useful optical brighteners ($A_2$) are generally Known substances of the type usually employed for the optical brightening of synthetic and semisynthetic textile fibres from an aqueous dispersion, in particular those of the coumarin, naphthalimide, benzoxazole, stilbene, bisstyrylbenzene, thiophene or pyrene series and which may bear any substituents usual in the case of optical brighteners, especially non-chromophoric and non-water-solubilizing substituents.

Sultable optical brighteners ($A_2$) are for example those of the following formulae (V) to (XI)

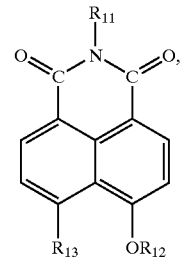

wherein
$R_{11}$ signifies $C_{1-4}$-alkyl,
$R_{12}$ signifies $C_{1-4}$-alkyl and
$R_{13}$ signifies hydrogen or $C_{1-4}$-alkoxy,

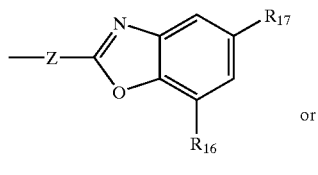

wherein
$R_{14}$ signifies hydrogen, chlorine or $C_{1-4}$-alkyl,
$R_{15}$ signifies hydrogen or $C_{1-4}$-alkyl,
Y signifies a radical of the formula

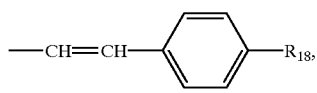

$R_{16}$ signifies hydrogen or $C_{1-4}$-alkyl,
$R_{17}$ signifies hydrogen, chlorine or $C_{1-4}$-alkyl, $R_{18}$ signifies —CN, ($C_{1-4}$-alkoxy)-carbonyl, phenyl or a radical of the formula

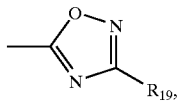

(c)

$R_{19}$ signifies $C_{1-4}$-alkyl and

Z signifies —CH=CH—, 3,4-thiophenylene or 1,4-naphthylene,

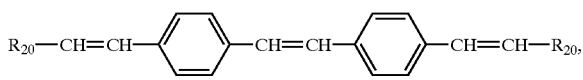

(VII)

wherein $R_{20}$ signifies —CN or ($C_{1-4}$-alkoxy)-carbonyl

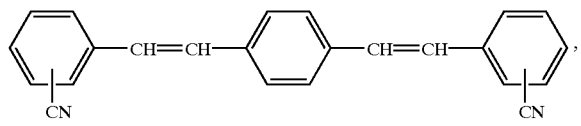

(VIII)

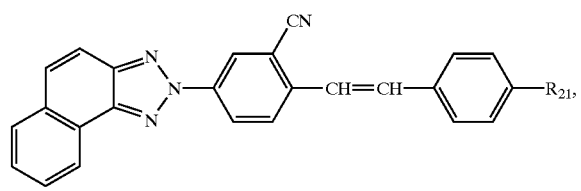

(IX)

wherein $R_{21}$ signifies hydrogen, chlorine, —CN or $C_{1-4}$-alkyl,

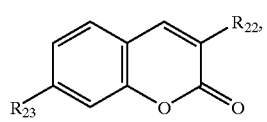

(X)

wherein $R_{22}$ signifies 1-pyrazolyl which is substituted with chlorine or $C_{1-4}$-alkyl in position 3 or 4, or signifies phenyl and $R_{23}$ signifies 2-triazolyl or 1-pyrazolyl which are substituted with $C_{1-4}$-alkyl and/or phenyl or signifies 2-naphthotriazolyl, and

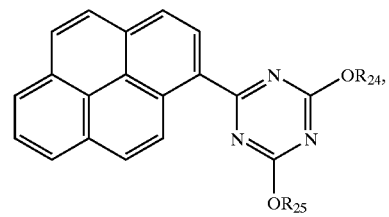

(XI)

wherein $R_{24}$ signifies $C_{1-4}$-alkyl and $R_{25}$ signifies $C_{1-4}$-alkyl.

The dispersant system (B) is used for dispersing the UV-active textile treatment agents (A) in water to obtain dispersions (U) having the above-indicated properties. It contains the polymeric components ($B_X$) and ($B_Y$) and may optionally cotain further surfactants and/or auxiliaries, especially ($B_Z$) at least one non-ionogenic or anionic surfactant other than ($B_X$) and/or ($B_W$) at least one dispersing auxiliary other than ($B_Y$).

As ($B_X$) there may be employed generally known products or products which are preparable analogously to known methods. The non-ionogenic dispersants $B_X$ are hydrophilic. They are in particular polymers containing a polymeric lipophilic base structure and hydrophilic polyethylene glycol ether chains. Preferably they are polycondensates of phenolic compounds with formaldehyde to form corresponding novolaks in which the polyethylene glycol ether chains can be introduced before or after the polycondensation and may, if desired, be partly or wholly capped by alkylation. Suitable starting phenols are unsubstituted phenol or phenol substituted with lower alkyl or alkoxy, alkyl preferably being methyl or ethyl and alkoxy is preferably being methoxy. When the phenol is ring-substituted, the positions ortho and para relative to the hydroxyl group are advantageously unsubstituted; when the phenol thus bears such a substituent, this is preferably in position meta to the hydroxyl group; when the phenol bears two substituents, these are preferably in the two m-positions. There may be mentioned in particular: phenol, m-cresol, 3-ethylphenol, 3-methoxyphenol and 3,5-dimethylphenol, of which unsubstituted phenol is preferred. The phenolic compounds may be oxyethylated with ethylene oxide before or also after the condensation with formaldehyde. The condensation with formaldehyde is advantageously carried out using such a molar ratio of formaldehyde/phenolic compound as to produce a crosslinked polymer, for example a molar ratio of formaldehyde/phenolic compound of $\geq 1.2/1$, preferably in the range from 1.4/1 to 2.5/1, particularly preferably 1.6/1 to 2.3/1. The formaldehyde can be used in the form of an aqueous solution or else in the form of paraformaldehyde. The condensation advantageously takes place in an aqueous medium, under distinctly acidic conditions (set for example by the addition of a strong acid, advantageously a mineral acid, preferably sulphuric acid) for example in the pH range from 1 to 5, preferably from 2 to 4. If desired, mixtures of oxyethylated and non-oxyethylated phenols, for example in a molar ratio of 95/5 to 5/95, in particular 90/10 to 20/80, may be used. Optionally a minor fraction of other oxiranes (e.g. propylene oxide, butylene oxide or styrene oxide) may be added, for example 0.1 to 1 mol per mole of phenol, to have been added, but preferably no oxiranes other than ethylene oxide are added.

After oxyethylation, the terminal hydroxyl groups may optionally be capped, preferably by etherification, for example by alkylation with $C_{1-4}$-alkyl, especially ethyl or methyl (for example by reaction with a corresponding alkyl chloride or dialkyl sulphate). This capping, in particular the etherification, may be carried out partially or completely, preferably to an extent of not less than 80 mol-%, especially not less than 95 mol-%, particularly preferably exhaustively. The oxyethylation (whether before or after the formaldehyde condensation) is advantageously carried on to such a degree that the product ($B_X$) has a distinctly hydrophilic character in that the HLB is advantageously $\leq 16$; the HLB is particularly >8, preferably ≧10, particularly preferably in the range from 12 to 16.

The thickeners ($B_Y$) are hydrophilic polymers of vinyl compounds; they have an anionic or non-ionogenic character and may optionally be crosslinked. The anionic polymers ($B_Y$) are preferably carboxyl-containing polymers. As thickeners ($B_Y$) chiefly the following may be mentioned:

($B_{Y1}$) a carboxyl-containing crosslinked copolymer, ($B_{Y2}$) a non-ionogenic (co)polymer essentially free from hydrogen bonded to hetero atoms and ($B_{Y3}$) a polyvinyl alcohol or a mixture of two or more thereof.

The copolymers ($B_{Y1}$) are carboxyl-containing and crosslinked. They may be prepared in a manner conventional per se, by copolymerization of corresponding monomers which contain an ethylenic double bond, of which at least a portion are carboxyl-containing monomers and at least a portion is a crosslinking comonomer. Non-ionogenic comonomers may also have been incorporated in the polymer, if desired. The carboxyl-containing monomers are advantageously carboxyl-containing monomers which contain at least two carboxyl groups and 4 to 6 carbon atoms and are preferably used as anhydride, especially as cyclic dicarboxylic anhydride, for example itaconic acid or especially maleic acid or respectively its anhydride. The monomers or comonomers preferred for preparing ($B_{Y1}$) are in particular ($B_{Y11}$) maleic acid and maleic anhydride, ($B_{Y12}$) at least one monoethylenically unsaturated non-ionogenic comonomer and ($B_{Y13}$) a crosslinking comonomer, and ($B_{Y1}$) is preferably a copolymer of ($B_{Y11}$), ($B_{Y12}$) and ($B_{Y13}$).

As comonomers ($B_{Y12}$) are chiefly suitable low molecular weight compounds, especially alkyl (meth)acrylates wherein alkyl advantageously contains 1 to 4 carbon atoms and preferably is methyl or ethyl, alkyl vinyl ethers wherein alkyl advantageously contains 1 to 4 carbon atoms and is preferably methyl, vinyl esters of low molecular weight aliphatic carboxylic acids, in particular of those having 2 to 4 carbon atoms, chiefly vinyl acetate or vinyl propionate, and/or vinylpyrrolidone.

As crosslinking comonomers ($B_{Y13}$) are suitable especially non-ionogenic compounds which contain at least two mutually unconjugated ethylenic double bonds, advantageously at least two terminal double bonds, for example N,N'-methylenediacrylamide, ($\alpha,\omega$-alkanedianes having 5 to 12 carbon atoms or divinyl ethers of $\alpha,\omega$-alkanediols having for example 2 to 12 carbon atoms in the alkane moiety or of polyethylene glycols, or also divinylbenzene. Of the crosslinking comonomers mentioned, the $\alpha,\omega$-alkanedienes are preferred.

The molar ratio ($B_{Y11}$)/($B_{Y12}$)/($B_{Y13}$) is advantageously in the range of 1/(0.2–3)/(0.0001–0.01), preferably 1/(0.5–1.8)/(0.0004–0.004), particularly preferably 1/(0.8–1.2)/(0.0004–0.001).

The copolymers ($B_{Y1}$) are known or can be prepared analogously to known methods, expediently in the presence of a suitable initiator of free-radical polymerization [e.g. azobisisobutyronitrile, benzoyl peroxide, acetylbenzoyl peroxide, di-t.butyl peroxide, t.butyl peroxypivalate, azobis-(2,4-dimethyl-valeronitrile), for example in concentrations of from 0.001 to 1%] and advantageously in the presence of a suitable aprotic solvent, for example benzene, toluene, xylene, acetone, methyl ethyl ketone, methylene chloride, cyclohexane and/or ethyl acetate; it is particularly advantageous to use a mixture of cyclohexane and ethyl acetate. The polymerization is advantageously carried out at temperatures in the range from 50 to 100° C., preferably in the range from 60 to 80° C. The production of the polymer is advantageously carried out in such a way that crosslinking takes place intramolecularly at least to some extent, especially in such a way that the linear sequence of the monomers forms loops in the course of the polymerization owing to the copolymerized crosslinking monomer ($B_{Y13}$). Since the carboxyl-containing monomer, especially ($B_{Y11}$), is advantageously used in the form of the anhydride, especially maleic anhydride, the polymer ($B_{Y1}'$) prepared therefrom still contains the anhydride groups. This polymer ($B_{Y1}'$) may, after completion of the polymerization and removal of the solvent, be hydrolyzed to the carboxyl-containing polymer ($B_{Y1}$) in salt form. In a preferred process, this hydrolysis takes place in the presence of anionic or non-ionogenic surfactants, for example at least a portion of the surfactants ($B_Z$).

The polymers ($B_{Y1}'$) and ($B_{Y1}$) may be produced for example by the process described in U.S. Pat. No. 5,024,779; the content of this U.S. Patent is incorporated herein by reference.

Thickeners ($B_{Y2}$) are chiefly thickeners which are essentially linear and essentially free from hydrogen attached to hetero atoms, in particular free from hydroxyl groups and —CONH groups. Suitable monomers are in particular vinyl compounds which contain cyclic or disubstituted amide groups or which contain ester groups. The thickeners ($B_{Y2}$) are for example polyvinylpyrrolidones (having for example an average molecular weight in the range from 10000 to 200000) or preferably copolymers of ($B_{Y21}$) 2-vinylpyrrolidone and ($B_{Y22}$) a vinyl ester of a $C_{2-4}$-alkanoic acid.

Suitable ($B_{Y22}$) are in particular vinyl acetate and preferably vinyl propionate. The molar ratio of ($B_{Y21}$):($B_{Y22}$) is for example in the range from 10:1 to 1:10, preferably 5:1 to 1:3, especially 4:1 to 1:1. The molecular weight is advantageously in such a range that the polymer is swellable, for example in the range from 5000 to 5000000, advantageously 20000 to 2000000, preferably 100000 to 1500000. Such copolymers are generally known or preparable analogously to known methods.

As ($B_{Y3}$) are suitable generally polyvinyl alcohols and copolymers thereof with vinyl acetate comonomers or partial hydrolysates of corresponding polyvinyl acetates. Preferably ($B_{Y3}$) is a polyvinyl alcohol whose 4% aqueous solution has a viscosity (to DIN 53015) at 20° C. which is for example in the range from 2.5 to 70 cP, advantageously 2.5 to 40 cP, preferably 2.5 to 30 cP.

The weight ratio of ($B_X$)/($B_Y$) is advantageously in the range from 0.01/1 to 10/1, preferably 0.05/1 to 4/1, especially 0.1/1 to 1/1; the weight ratio of($B_X$)/(A) is advantageously within the range from 1/100 to 80/100, preferably 2/100 to 20/100, especially 3/100 to 10/100; and the weight ratio of ($B_Y$)/(A) is advantageously in the range from 0.1/100 to 120/100, preferably 0.2/100 to 60/100, especially 0.5/100 to 40/100.

As ($B_Y$) there may be used one or more of the components ($B_{Y1}$), ($B_{Y2}$) and ($B_{Y3}$), advantageously two or three thereof, preferably at least one component ($B_{Y2}$) and particularly preferably at least one of the components ($B_{Y1}$) and ($B_{Y3}$), the combination of ($B_{Y2}$) with ($B_{Y1}$) being particulaly preferred. When ($B_{Y1}$) is used, the weight ratio of ($B_{Y1}$)/(A) is advantageously in the range from 0.05/100 to 0.5/100, preferably 0.1/100 to 1.3/100; when ($B_{Y2}$) is used, the weight ratio of ($B_{Y2}$)/(A) is advantageously in the range from 1/100 to 30/100, advantageously 2/100 to 20/100;

when ($B_{Y3}$) is used, the weight ratio of ($B_{Y3}$)/(A) is advantageously in the range from 2/100 to 120/100, preferably 5/100 to 50/100, the weight ratio of ($B_{Y3}$)/(A) being advantageously in the range from 2/100 to 35/100 if also at least one of ($B_{Y1}$) and ($B_{Y2}$) is present.

It is advantageous to use at least one surfactant ($B_Z$) in addition to ($B_X$). The surfactants ($B_Z$) are surfactants which are suitable for supporting the dispersing effect of ($B_X$) in the presence of ($B_Y$) and optionally ($B_W$); they are distinctly hydrophilic and also encompass such surfactants as are known in the art for example as wetting agents, detergents or emulsifiers. Advantageously, ($B_Z$) comprises ($B_{Z1}$) anionic surfactants and/or ($B_{Z2}$) non-ionogenic surfactants other than ($B_X$).

As ($B_{Z1}$) there may be employed any anion-active surfactants of high hydrophilicity, in particular compounds of distinctly anionic character which contain at least one lipophilic radical, in particular at least one lipophilic hydrocarbon radical, and at least one distinctly anionic group (sulpho group, phosphoric acid group or carboxyl group), the lipophilic hydrocarbon radical advantageously containing at least 9 carbon atoms, for example 9 to 30 carbon atoms. The following may be mentioned by way of example:

condensation products of formaldehyde with sulphonated aromatic compounds (for example sulphonated naphthalene, mono- or di-($C_{1-4}$alkyl)-naphthalene, biphenyl, diphenyl ether, ditolyl ether, phenol, $C_{1-4}$-alkylphenol and/or corresponding sulphones) and/or with ligninsulphonate, optionally in a mixture with dihydroxydiphenyl sulphone;

ligninsulphonates;

$C_{12-24}$-alkyl sulphonates, particularly n- or iso-$C_{12-24}$-alkyl sulphonates;

sulphonation products of paraffins (prepared for example by sulphochlorination or sulphoxidation), of α-olefins, of alkylbenzenes and of unsaturated fatty acids;

$C_{12-24}$-fatty acid salts;

esterification products of non-ionogenic surfactants as described under ($B_{Z2}$), in particular of oligoethylene glycol ethers of fatty alcohols, alkylphenols or di- or tristyrylphenols, with sulphuric acid, phosphoric acid or aminosulphonic acid, or alkylation products of the mentioned non-ionogenic surfactants with chloroacetic acid or chloropropionic acid, to form the corresponding esters or carboxymethylated or carboxyethylated products.

The anionic surfactants are advantageously present, at least partly, in the form of salts, chiefly in the form of alkali metal salts (preferably sodium or potassium salts) or ammonium salts. It is possible to use single compounds or also mixtures of compounds, including especially technical grade mixtures.

As non-ionogenic surfactants ($B_{Z2}$) there may be employed distinctly hydrophilic surfactants, especially those which act as cosurfactants to ($B_{Z1}$). Generally known substances are suitable, principally those containing 9 to 30, preferably 12 to 24, carbon atoms in the lipophilic moiety and whose hydrophilic moieties contain ethylene glycol radicals, glycerol radicals and/or sorbitan radicals. As examples there may be mentioned:

adducts of ethylene oxide to fatty alcohols (including for example oxo alcohols), alkylphenols, di- or tristyrylphenols or fatty acid N,N-diethanolamide or diisopropanolamide; fatty acid monoesters of polyethylene glycols. Polypropylene glycol chains may occasionally also occur in the molecule as lipophilic radicals, and accordingly the non-ionogenic surfactants used can also comprise block copolymers which contain propyleneoxy and ethyleneoxy units, and also optionally styreneoxy and/or butyleneoxy units (for example those known under the designation "Pluronic"). The HLB value of the non-ionogenic surfactants ($B_{Z2}$) is advantageously>8, preferably≧10, in particular in the range from 12 to 18, preferably 12 to 15, while those having an HLB value>15, preferably≧16, may also be used as protective colloids.

The surfactants ($B_Z$) are advantageously chosen so that they will assist and/or complete the dispersing effect of ($B_X$) in the presence of ($B_Y$) and optionally ($B_W$). Of the surfactants ($B_Z$), the anionic ones are preferred, especially the aliphatic hydrocarbon sulphonates ($B_{Z1}'$).

Preferably at least one anionic surfactant ($B_{Z1}$) is employed, optionally in the presence of a cosurfactant ($B_{Z2}$). The weight ratio of ($B_{Z1}$)/($B_{Z2}$) is for example in the range from 30/70 to 100/0. Preferably, as ($B_Z$) there are not employed any non-ionogenic surfactants ($B_{Z2}$) or only minor amounts thereof are employed, for example 0 to 40%, preferably 0 to 20%, of ($B_{Z2}$), based on ($B_{Z1}$). When ($B_{Z2}$) is used as cosurfactant to ($B_{Z1}$), the weight ratio of ($B_{Z2}$)/($B_{Z1}$) is advantageously 1/100 to 40/100, preferably 5/100 to 20/100.

The employed or respectively suitable amount of ($B_Z$) can vary widely, especially depending on the kind and amount of the other components ($B_X$), ($B_Y$) and any dispersing auxiliary ($B_W$) optionally added. For example, the amount of ($B_Z$) may be 2 to 70% by weight of (B), preferably 5 to 50% by weight of (B).

Dispersing auxiliaries ($B_W$) may optionally be employed in addition in order that the dispersing effect of ($B_X$) and optionally ($B_Z$) in the presence of ($B_Y$) may be sustained and/or the appearance of the dispersion improved.

As ($B_W$) there are particularly worth mentioning:

($B_{W1}$) protective colloids, ($B_{W2}$) wetting agents and/or ($B_{W3}$) solubilizers If desired, polymeric protective colloids ($B_{W1}$) may be employed which differ from the abovementioned polymers; preferably ($B_{W1}$) is at least one non-ionogenic and/or anionic protective colloid. Suitable polymeric protective colloids ($B_{W1}$) include known substances which—in contrast to the surface-active protective colloids of high hydrophilicity mentioned above under ($B_{Z2}$)—have the character of polymers capable of forming a protective sheath around the dispersed colloid particles. The addition of a protective colloid ($B_{W1}$) may optionally also additionally influence the storage and transport stability of (U). As protective colloids ($B_{W1}$) there may e.g. be employed polysaccharides, polysaccharide derivatives, (co)poly(meth)acrylic acids and also protective colloids which are also useful as thickening substances, for example polyethylene glycols having for example an average molecular weight in the range from 200 to 10000, chiefly 300 to 6000, xanthan gum, cellulose gum, guar gum, dextrins, gum arabic, carboxymethylcellulose and acrylic-modified polysaccharides. Advantageously, the acid groups, particularly the carboxylic acid groups, are at least partly present in the form of salts (so that the respective products are water-soluble), for example as alkali metal salts (chiefly sodium salts). When protective colloids ($B_{W1}$) are used, they are advantageously used in such amounts that the viscosity of the aqueous concentrated dispersion is <1000 mPas, especially ≦300 mPas, preferably in the range from 50 to 200 mPas.

Among the protective colloids ($B_{W1}$), preference is given to the non-ionogenic ones, for example polyethylene glycol.

When a protective colloid ($B_{W1}$) is used, the weight ratio of ($B_{W1}$)/(A) is for example in the range from 1/100 to 200/100, preferably 2/100 to 150/100.

($B_{W2}$) may be any wetting agent known per se, preferably at least one non-ionogenic or anionic wetting agent. As non-ionogenic wetting agents come generally into consideration surfactants of the abovementioned categories which, however, have a correspondingly lower HLB value or contain a correspondingly lower number of added ethyleneoxy units. As anionic wetting agents there may be mentioned e.g. mono- and dialkyl esters of sulphosuccinic acid. The anionic groups, analogously as described above for ($B_{Z1}$), may advantageously be present as alkali metal salts or ammonium salts.

The use of wetting agents ($B_{W2}$) is possible; however, very effective dispersions can be prepared even without such wetting agents. If a wetting agent is used, the weight ratio of ($B_{W2}$)/(A) is for example $\leq 10/100$, for example in the range from 0/100 to 5/100.

If desired or required, solubilizers ($B_{W3}$) may be used, in particular non-ionogenic solubilizers, for example mono-, di- or oligoethylene glycols or their mono- or di-($C_{1-4}$-alkyl) ethers or glycerol.

A solubilizer ($B_{W3}$) may optionally be used. However, very good dispersions can be prepared even without solubilizer. If a solubilizer is used, the weight ratio of ($B_{W3}$)/(A) is advantageously $\leq 10/100$, for example in the range from 1/100 to 8/100.

The dispersing system may, if desired, include still further surfactants and dispersing auxiliaries, but preferably it contains no further components in addition to the abovementioned ($B_X$) and ($B_Y$) and optionally ($B_Z$) and/or ($B_W$). Preferably, (B) consists essentially of the mentioned ($B_X$) and ($B_Y$) and optionally ($B_Z$) and/or ($B_W$).

To disperse (A) in water, it is advantageous to choose a suitable amount of ($B_X$) and optionally ($B_Z$), which can vary depending on the kind of the components and their concentration.

The weight ratio of the total components ($B_X$)+($B_Y$)+($B_Z$) to (A) is advantageously in the range from 5/100 to 150/100, preferably 6/100 to 80/100, particularly preferably 10/100 to 70/100.

The weight ratio of the total dispersing system (B) to (A) is for example in the range from 5/100 to 250/100, advantageously in the range from 10/100 to 150/100, preferably 20/100 to 150/100. When neither a component ($B_{W1}$) nor a component ($B_{W3}$) is used, the weight ratio of the total dispersing system (B) to (A) is for example in the range from 5/100 to 80/100, advantageously in the range from 10/100 to 60/100, preferably 15/100 to 50/100.

The products (A) and (B) may be used in purified or unpurified form, i.e. the aqueous dispersions (U) may optionally also include (C) by-products and/or concomitants from the synthesis of (A) and/or (B).

The aqueous dispersions (U) may optionally include further additives, especially (D) at least one formulation additive and/or (E) at least one agent for setting the pH.

The further formulation additives (D) may optionally be used, for example to further adapt the properties of the dispersions (U) to particular requirements or wishes concerning transport, storage and/or use. Such additives are in particular at least one of the following:

($D_1$) a defoamer ($D_2$) an agent to protect against the damaging action of microorganisms and/or ($D_3$) a dye.

Any defoamers are suitable as ($D_1$), for example paraffins or mineral oils in dispersed form, silicone defoamers, silica, ethylenebisstearamide and/or mixtures of two or more thereof. Commercially available products may be used in particular. The amounts of defoamer which can be used in the compositions of the invention, are in the ranges conventional per seand are in general dependent on the nature and amount of the surfactants. In general, very small amounts of defoamer are sufficient, e.g. $\leq 1\%$ by weight, especially 0.01 to 0.4% by weight, based on the entire aqueous composition (U).

As components ($D_2$) are suitable in general known substances, essentially fungi- or bacteriostatic substances and/or microbicides, as are commercially available, and the concentrations used may conform to those recommended for each, for example $\leq 1\%$ by weight, particularly 0.01 to 0.4% by weight, based on the entire aqueous dispersion (U).

If as (A) there is employed ($A_2$), i.e. an optical brightener, a component ($D_3$) may also be employed. ($D_3$) is advantageously a disperse dye of the type usable in general for shading disperse brighteners. Disperse dyes are a generally known category of dyes and are known in the art and extensively described in the technical literature, for example in the Colour Index. Suitable components ($D_3$) include any disperse dyes which possess a colour suitable for shading optical brighteners, for example blue, violet and red disperse dyes. They are advantageously added in low concentrations, for example $\leq 0.1\%$ by weight based on ($A_2$), as is generally sufficient in order, for example, that a yellowish, greenish or brownish shade of the substrate may be partially compensated or/and a, for example, greenish self-colour of the optical brightener, which may become evident at a certain application concentration, may be balanced out and thereby the visual impression created by the optical brightening may be improved.

By adding components (E), in particular of suitable bases (e.g. of alkali metal hydroxide or carbonate and/or of an amine as described above for salt formation) or/and of acids (e.g. of a mineral acid, such as hydrochloric acid, sulphuric acid and phosphoric acid, or of a low molecular weight aliphatic carboxylic acid e.g. with 1 to 4 carbon atoms) and optionally of buffer salts, in particular of mono- and/or di-sodium and/or -potassium phosphate, the pH of the dispersion may e.g. be set to values in the range from 3.5 to 8, preferably 4 to 7.

Preferred aqueous dispersions (U) of the invention are those which consist essentially of (A), (B) and water and optionally at least one of the components (C), (D) and (E).

The (A) content of the concentrated aqueous dispersions (U) is for example in the range from 2 to 50% by weight, advantageously 5 to 45% by weight, preferably 10 to 40% by weight. The water content of the concentrated aqueous dispersions (U) of the invention is advantageously in the range from 90 to 30%, preferably 70 to 33%, by weight.

The dispersions (U) of the invention can be produced as described above, in particular with grinding, wherein with the aid of suitable mills, for example ball mills or bead mills (glass or porcelain beads), the dispersed particles may be ground to a particle size of the desired fineness, and, if desired, a portion of the components, particularly of the water-soluble or else water-thinnable components, particularly for example ($B_{W1}$), ($B_{W3}$), ($D_2$) and/or ($D_3$), may also not be mixed in until after the grinding. The average particle size of the dispersed particles in the dispersions (U) of the invention is advantageously in the range from 0.05 to 10 $\mu$m, preferably 0.2 to 6 $\mu$m, particularly preferably 0.4 to 4 $\mu$m.

Preferably, the dispersions are filtered through a suitable sieve or a suitable filter in such a way that the dispersed particles are not larger than 20 μm, preferably not larger than 10 μm, particularly preferably not larger than 6 μm.

The amount of water employed is in principle freely choosable; advantageously, sufficient water is added for the dispersion to be stirrable and pourable or respectively pumpable. During grinding the amount of water present in the dispersion is advantageously such that the concentration of (A) in (U) is e.g. 2 to 50% by weight, preferably 5 to 45% by weight. More dilute dispersions are e.g. application liquors and stock dispersions which may optionally also contain further application-dictated additives. Concentrated to dilute dispersions may thus be produced, e.g. those having an (A) content in the range from 0.01 to 50% by weight. In application liquors the (A) concentrations are e.g. 0.01 to 20% by weight, preferably 0.05 to 1% by weight, in stock dispersions e.g. 0.1 to 20% by weight, preferably from 0.5 to 10% by weight, in concentrated dispersions e.g. 5 to 45% by weight, preferably 10 to 40% by weight. The concentrated dispersions (U) are a particular aspect of the invention.

The aqueous dispersions (U) prepared as described herein, even the concentrated ones, are surprisingly stable and flowable (in particular liquid). The concentrated dispersions have in particular a viscosity which is <1000 mPa·s; preferably, they have a viscosity in the range from 20 to 300 mPa·s, preferably 50 to 200 mPa·s, so that they are also efficiently pumpable. They may be handled, stored and/or transported and also be used directly for metered addition, so as they have been prepared. They are notable for surprisingly good stability in storage and transport.

The dispersions (U) of the invention serve for the corresponding UV-active finishing of textile material, in particular textile material which can be dyed with disperse dyes or optically brightened with disperse brighteners. Suitable textile material includes in particular textile material composed of synthetic and semisynthetic materials, chiefly of polyester, polyamides, polyurethanes and cellulose acetates, and also of fibre blends comprising such synthetic or semisynthetic materials (e.g. polyester/cotton, polyester/viscose, polyester/cotton/elastane). The textile material may be in any desirable processed state suitable for the particular application, for example in the form of loose fibres filaments, yarns, hanks, wovens, knits, carpets, ready-made and half-ready-made goods. Particular preference is given to using the dispersions (U) of the invention in the HT dyeing of yarns, which are wound on packages, especially in the form of cheeses, or in the optical brightening by the HT or thermosol processes.

The dispersions (U) of the invention are highly compatible with disperse dyes (F) and, when (A) is a UV absorber ($A_1$), are advantageously formulated together with a suitable disperse dye (F) to form an aqueous liquor which includes both the disperse dye (F) and the UV absorber ($A_1$). The disperse dye (F) may be any desired disperse dye or disperse dye mixture as are otherwise used for dyeing synthetic or semisynthetic textile material. Disperse dyes are generally known and extensively described in the technical literature, for example in the Colour Index under the heading "Disperse Dyes". Disperse dyes are generally formulated with suitable dispersants in order that they may be dispersed in the dyeing liquor; the dispersants used for this purpose are usually anionic and optionally non-ionogenic dispersants, for example such as described under ($B_1$). Disperse dyes formulated in this way customarily include 30 to 60% of dye and about 70 to 40% by weight of dispersant besides, optionally, traces of by-products.

When (A) is an optical brightener ($A_2$), generally either no dyes will be employed at all or dyes will be employed as described under ($D_3$) for shading.

She concentrations of dyes (F) in the respective liquor may vary within wide limits, depending on the substrate, the choice of dyeing method and the choice of depth of shade. The concentration of (U) in the liquor is generally dependent on the nature and the content of (A) and on the desired UV-active effect. Concentrations are employed, for example, such that the concentration of ($A_1$) based on the substrate is in the range from 0.1 to 4% by weight, preferably 0.2 to 2% by weight. The concentration of ($A_2$) based on the substrate is advantageously chosen so as to obtain a good white effect and may also vary according to substrate, application method and constitution of ($A_2$); it is for example within the range from 0.01 to 4%, advantageously 0.05 to 3%, preferably 0.1 to 2%, by weight. The liquor pH is advantageously in the distinctly acidic to nearly neutral range, for example in the pH range from 4 to 6.5, preferably 5 to 6.

The liquors may be applied to the textile material by conventional methods, for example by exhaust processes or impregnation processes, and at appropriate suitable liquor lengths and temperature conditions. For impregnation processes, the liquors may be applied to the substrate by customary methods, e.g. by padding, dipping or spraying, and the impregnated substrate, optionally after intermediate drying, may then be thermofixed at elevated temperature, e.g. in the range from 150 to 220° C., in which case a suitable fixation temperature can be chosen according to the material (for polyester e.g. from 160 to 220° C., for other synthetic fibres and for semisynthetic fibres e.g. from 150 to 180° C.). For exhaust processes short or also long liquors may be employed, e.g. liquor-to-goods ratios in the range from 2:1 to 100:1, usually 3:1 to 60:1. For HT processes and especially for the preferred treatment of cheeses, liquor-to-goods ratios of 4:1 to 40:1, in particular 5:1 to 20:1, are preferred; the temperatures may also vary as desired in the respectively suitable ranges, for example from 95 to 180° C., HT conditions being preferred, e.g. in the range from 105 to 180° C., preferably $\geq$125° C., e.g. in the range from 125 to 135° C.

To dye or optically brighten the cheeses, according to a preferred procedure the packages are immersed into the liquor or have the liquor poured over them and then the liquor is pumped through the cheese (from in to out or vice versa or also alternately) for the entire dyeing time. As the liquor is pumped through the package, the temperature is slowly raised, for example at a rate of 0.5 to 5° C. per minute, preferably 1 to 4° C. per minute, until the desired dyeing temperature (HT conditions) is reached, at which dyeing may be carried out e.g. for 20 to 60 minutes, and then it is brought back down slowly, for example at a rate of 1 to 10° C. per minute, preferably 2 to 6° C. per minute. The overpressure upstream of the package may be for example in the range from 0.02 to 0.5 bar, preferably 0.5 to 0.2 bar, while—using the dispersions (U) of the invention, especially the preferred ones—practically no pressure build-up takes place during the entire dyeing or brightening operation.

The dispersions (U) of the invention are very stable to the destabilizing action of high shearing forces as may occur in particular application processes. especially for example in cheeses and in jet dyeing machines (dye-jets), and are therefore particularly suitable for such processes. They are also stable to any irregular action of high temperatures as may occur on the treated substrate, for example in the course of the drying and/or thermofixing after an impregnation process, and are therefore also particularly suitable for such application processes (i.e. impregnating and thermofixing).

In the following Examples, parts are parts by weight and percentages are percentages by weight; the temperatures are reported in degrees Celsius; C.I. denotes the Colour Index; the disperse dyes and optical brighteners employed in the Examples are commercially available products containing about 50% of pure dye or pure brightener and about 50% of dispersant; the other additives, apart from the products of Examples 1 to 53, are commercial products.

EXAMPLES

Example 1

20 parts of C.I. Fluorescent Brightener 135, 1 part of phenolic novolak-polyethylene glycol ether methylated, with HLB =14, 1 part of $C_{13-16}$-alkanesulphonate, 0.2 part of copolymer of maleic anhydride, methyl vinyl ether and 1,9-decadiene in a molar ratio of 1:1:0.0125, prepared analogously to example 1 of U.S. Pat. No. 5,024,779, which as a 0.5% aqueous suspension at pH 7.0 has an average particle size <75 μm and a rotation viscosity of 45000 to 70000 mPa·s (spindle no. 7, 20 rpm)

0.4 part of a commercially available defoamer 0.2 part of fungicide (GivGard DXN) and 63.1 parts of water are bead-milled to form a fine uniform suspension and then mixed with 0.1 part of C.I. Disperse Blue 73 and 10 parts of polyethylene glycol of molecular weight 600 by stirring until a uniform dispersion has formed.

The table hereinbelow lists the percentage composition of further aqueous dispersions of the invention which are preparable similarly to Example 1. The numbers reported for each component are percentages in the respective aqueous dispersion.

The products used in examples 2–53 hereinbelow are the following:

$A_{1A}$ UV absorber of the formula

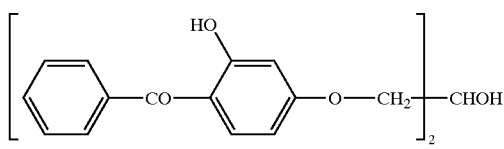

$A_{1B}$ UV absorber: 2-(2'-hydroxy-3'-t.butyl-5'-methylphenyl)-5-chlorobenzotriazole $A_{2A}$ C.I. Fluorescent Brightener 135

$A_{2B}$ C.I. Fluorescent Brightener 179

$A_{2C}$ C.I. Fluorescent Brightener 330

$A_{2D}$ C.I. Fluorescent Brightener 199

$B_{XA}$ phenolic novolak-polyethylene glycol ether methylated, with HLB 14

$B_{Y1A}$ copolymer of maleic anhydride, methyl vinyl ether and 1,9-decadiene in a molar ratio of 1:1:0.0125, prepared analogously to example 1 of U,S. Pat. No. 5,024,779, which as a 0.5% aqueous suspension at pH 7.0 has an average particle size <75 μm and a rotation viscosity of 45000 to 70000 mPa·s (spindle no. 7, 20 rpm)

$B_{Y2A}$ copolyvinylpyrrolidone/vinyl propionate (average molecular weight $M_W$=750000)

$B_{Y2B}$ polyvinylpyrrolidone (average molecular weight $M_W$=30000)

$B_{Y3A}$ polyvinyl alcohol having residual acetyl content of 10.7% (viscosity of 4% aqueous solution at 20° C.=4 cP—according to DIN 53015)

$B_{Y3B}$ polyvinyl alcohol having residual acetyl content of 10.7% (viscosity of 4% aqueous solution at 20° C.=8 cP—according to DIN 53015)

$B_{Z1A}$ $C_{13-18}$-alkanesulphonate (sodium salt)

$B_{Z2A}$ addition product of 8 mol of ethylene oxide with 1mol of isoundecanol $B_{Z1B}$ dialkylnaphthalenesulphonate formaldehyde condensation product (sodium salt)

$B_{W1A}$ polyethylene glycol 600

$B_{W1B}$ polyethylene glycol 400

$B_{W3A}$ diethylene glycol $B_{W3B}$ glycerol $D_{1A}$ defoamer emulsion ("Antifoam Emulsion B")

$D_{2A}$ Biocide ("GivGard DXN")

$E_A$ 30% hydrochloric acid $E_B$ phosphoric acid (85%)

In Examples 25 and 26, the optical brightener has been shaded with 0.5% of C.I. Disperse Blue 73

TABLE

| Ex. No. | $B_{XA}$ | $B_{Z1A}$ | $B_{Z1B}$ | $B_{Z2A}$ | $B_{Y1A}$ | $B_{Y2A}$ | $B_{W3A}$ | $B_{W1A}$ | $B_{W1B}$ | $B_{W3B}$ | $D_{2A}$ | $D_{1A}$ |
|---|---|---|---|---|---|---|---|---|---|---|---|---|
| 2 | 4.00 | 1.00 | | | | 2.50 | 10.0 | | | | 0.20 | 0.40 |
| 3 | 3.00 | 1.00 | | 0.20 | 0.20 | 1.00 | 13.0 | | 2.00 | | 0.20 | 0.40 |
| 4 | 3.00 | 1.00 | | 0.20 | 0.20 | 1.00 | 15.0 | | | | 0.20 | 0.40 |
| 5 | 4.00 | 1.30 | | 0.30 | 0.12 | | 13.0 | | | | 0.20 | 0.40 |
| 6 | 3.00 | 2.00 | | | 0.20 | | 10.0 | | | | 0.20 | 0.40 |
| 7 | 5.00 | 1.30 | | 0.20 | | 1.00 | 10.0 | | | | 0.20 | 0.40 |
| 8 | 3.00 | 1.00 | | | | 1.50 | 10.0 | | | | 0.20 | 0.40 |
| 9 | 3.00 | 1.00 | | 0.30 | 0.20 | 1.00 | 13.0 | | 2.00 | | 0.20 | 0.40 |
| 10 | 5.00 | 1.70 | | 0.40 | | 1.00 | | 15.0 | | | 0.20 | 0.40 |
| 11 | 3.00 | 0.70 | | | 0.20 | | | 15.0 | | | 0.20 | 0.40 |
| 12 | 5.00 | 2.00 | 3.3 | 0.40 | | 2.50 | | 15.0 | | | 0.20 | 0.40 |
| 13 | 5.00 | 1.70 | | 0.30 | | 1.50 | 15.0 | | | | 0.20 | 0.40 |
| 14 | 5.00 | 1.00 | 1.7 | 0.30 | 0.08 | 1.50 | 15.0 | | | | 0.20 | 0.40 |
| 15 | 5.00 | 1.50 | | 0.30 | 0.12 | 1.00 | | 15.0 | | | 0.20 | 0.40 |

TABLE-continued

| | | | | | | | | | | | | |
|---|---|---|---|---|---|---|---|---|---|---|---|---|
| 16 | 5.00 | 1.00 | | 0.20 | | 1.00 | | | | | 0.20 | 0.40 |
| 17 | 4.00 | 0.40 | 3.3 | 0.10 | | 2.50 | 10.0 | | 10.0 | | 0.20 | 0.40 |
| 18 | 3.00 | 1.00 | | 0.20 | | 2.50 | | 10.0 | | | 0.20 | 0.40 |
| 19 | 5.00 | 0.70 | | | 0.08 | | 10.0 | | | | 0.20 | 0.40 |
| 20 | 4.00 | 1.00 | 4.0 | 0.20 | 0.08 | 1.50 | | | 15.0 | | 0.20 | 0.40 |
| 21 | 1.70 | 0.40 | 1.3 | 0.20 | 0.03 | 1.50 | | 5.0 | | | 0.20 | 0.40 |
| 22 | 1.70 | 0.60 | | 0.10 | 0.05 | | 10.0 | | | | 0.20 | 0.40 |
| 23 | 1.00 | 0.30 | | 0.10 | | 1.00 | 3.3 | | | | 0.07 | 0.13 |
| 24 | 1.30 | 0.40 | | 0.10 | | | 3.3 | | | | 0.20 | 0.40 |
| 25* | 1.00 | 0.30 | 1.3 | 0.05 | 0.03 | 0.60 | | 5.0 | | | 0.20 | 0.40 |
| 26* | 1.70 | 0.30 | 1.3 | 0.05 | | 0.60 | 5.0 | 5.0 | | | 0.20 | 0.40 |
| 27 | 3.00 | 1.00 | | 0.20 | | 1.00 | 10.0 | | | | 0.20 | 0.40 |
| 28 | 3.00 | 1.00 | 1.7 | 0.20 | 0.20 | 1.00 | 10.0 | | | | 0.20 | 0.40 |
| 29 | 3.00 | 1.00 | | | 0.12 | 1.00 | 10.0 | | | | 0.20 | 0.40 |
| 30 | 3.00 | 1.00 | | 0.30 | 0.12 | 1.00 | 10.0 | | | | 0.20 | 0.40 |
| 31 | 3.00 | 1.00 | | 0.20 | | 1.00 | 10.0 | | | | 0.20 | 0.40 |
| 32 | 3.00 | 1.00 | 4.0 | 0.20 | | 1.30 | 15.0 | | | 2.00 | 0.20 | 0.40 |
| 33 | 3.00 | 1.00 | 4.0 | | | 0.70 | 13.0 | | | | 0.20 | 0.40 |
| 34 | 3.00 | 1.00 | | 0.20 | 0.08 | 0.50 | | 14.0 | | 1.00 | 0.20 | 0.40 |
| 35 | 3.00 | 1.00 | 3.3 | 0.30 | | 1.60 | | 15.0 | | | 0.20 | 0.40 |
| 36 | 3.00 | 1.00 | 4.0 | 0.20 | | 1.30 | 15.0 | | | 2.00 | 0.20 | 0.40 |
| 37 | 5.00 | 1.70 | | 0.40 | 0.08 | 1.60 | | 14.0 | | 1.00 | 0.20 | 0.40 |
| 38 | 3.00 | 1.00 | | 0.20 | 0.20 | 1.30 | 10.0 | | | | 0.20 | 0.40 |
| 39 | 4.00 | 1.30 | | 0.20 | 0.20 | | | 10.0 | | | 0.20 | 0.40 |
| 40 | 6.00 | 0.30 | 1.7 | 0.10 | | | 15.0 | | | | 0.20 | 0.40 |
| 41 | 3.00 | 1.70 | | 0.40 | | 3.30 | 10.0 | | | | 0.20 | 0.40 |
| 42 | 3.00 | 1.30 | | 0.30 | 0.12 | | | | 12.0 | | 0.20 | 0.40 |
| 43 | 4.00 | 1.30 | | 0.30 | | 2.50 | 5.0 | 5.0 | | | 0.20 | 0.40 |
| 44 | 5.00 | 1.00 | | 0.20 | 0.12 | | 15.0 | | | | 0.20 | 0.40 |
| 45 | 4.00 | 1.50 | | 0.30 | | 2.50 | | 10.0 | | | 0.20 | 0.40 |
| 46 | 5.00 | 1.00 | | 0.20 | 0.15 | 1.00 | 10.0 | | | | 0.20 | 0.40 |
| 47 | 4.00 | 1.00 | | | 0.15 | 1.30 | 15.0 | | | | 0.20 | 0.40 |
| 48 | 3.00 | 1.00 | | 0.20 | 0.12 | 0.50 | | 15.0 | | | 0.20 | 0.40 |
| 49 | 4.00 | 1.00 | 3.3 | 0.20 | | 1.70 | 15.0 | | | | 0.20 | 0.40 |
| 50 | 4.00 | 1.30 | | 0.30 | 0.12 | 1.00 | 15.0 | | | | 0.20 | 0.40 |
| 51 | 5.00 | 1.00 | | 0.20 | 0.08 | 1.70 | 10.0 | | | | 0.20 | 0.40 |
| 52 | 4.00 | 1.00 | | | 0.15 | | | 17.0 | | | 0.20 | 0.40 |
| 53 | 4.00 | 0.30 | | 0.10 | | 2.50 | | 15.0 | | | 0.20 | 0.40 |

| Ex. No. | $B_{Y3A}$ | $B_{Y3B}$ | $B_{Y2B}$ | $E_A$ | $E_B$ | $A_{2A}$ | $A_{2B}$ | $A_{2C}$ | $A_{2D}$ | $A_{1A}$ | $A_{1B}$ |
|---|---|---|---|---|---|---|---|---|---|---|---|
| 2 | 4.0 | | | 0.2 | | 20.0 | | | | | |
| 3 | 4.0 | | | 0.2 | | 20.0 | | | | | |
| 4 | 4.0 | | | | 0.2 | 20.0 | | | | | |
| 5 | | 2.0 | | | 0.2 | 20.0 | | | | | |
| 6 | 6.0 | | | 0.2 | | 20.0 | | | | | |
| 7 | | 3.0 | | 0.2 | | | 20.0 | | | | |
| 8 | | 2.0 | | | 0.2 | | 20.0 | | | | |
| 9 | 4.0 | | | 0.2 | | | 20.0 | | | | |
| 10 | | 5.0 | | 0.1 | | | 20.0 | | | | |
| 11 | | 4.0 | | | 0.2 | 17.0 | 3.0 | | | | |
| 12 | | 3.0 | | 0.2 | | 17.0 | 3.0 | | | | |
| 13 | 7.0 | | | 0.2 | | 17.0 | 3.0 | | | | |
| 14 | | | | 0.2 | | 17.0 | 3.0 | | | | |
| 15 | | 3.0 | | 0.2 | | | | 24.0 | | | |
| 16 | 3.0 | | 3.0 | 0.2 | | | | 24.0 | | | |
| 17 | 3.0 | | | 0.2 | | | | 24.0 | | | |
| 18 | | | | 0.2 | | | 24.0 | | | | |
| 19 | 2.0 | | 3.0 | | 0.2 | | 24.0 | | | | |
| 20 | | | 2.0 | | 0.2 | | 24.0 | | | | |
| 21 | | | 2.0 | 0.1 | | | 8.0 | | | | |
| 22 | | 5.0 | | 0.1 | | | 8.0 | | | | |
| 23 | | 7.0 | | 0.2 | | | 8.0 | | | | |
| 24 | | | 3.0 | | 0.1 | | 8.0 | | | | |
| 25* | | | 2.0 | 0.1 | | | 8.0 | | | | |
| 26* | | | 2.0 | 0.1 | | | 8.0 | | | | |
| 27 | | | | 0.2 | | | | 22.0 | | | |
| 28 | | | | 0.2 | | | | 22.0 | | | |
| 29 | | 2.0 | | | 0.2 | | | 22.0 | | | |
| 30 | | | | | 0.2 | | | 22.0 | | | |
| 31 | 6.0 | | | 0.2 | | | | 22.0 | | | |
| 32 | 2.0 | | | 0.2 | | | | 20.0 | | | |
| 33 | 2.0 | | | | 0.2 | | | 20.0 | | | |
| 34 | | | | | 0.2 | | | 20.0 | | | |
| 35 | | | | 0.2 | | | | 20.0 | | | |
| 36 | | | | | 0.2 | | | | | 20.0 | |
| 37 | | | | 0.2 | | | | | | 20.0 | |
| 38 | | | | 0.2 | | | | | | 20.0 | |

TABLE-continued

| # | C1 | C2 | C3 | C4 | C5 | C6 | C7 |
|---|---|---|---|---|---|---|---|
| 39 | | | | 0.2 | | 20.0 | |
| 40 | 3.0 | | 2.0 | 0.2 | | 20.0 | |
| 41 | | 2.0 | | 0.2 | | 20.0 | |
| 42 | 5.0 | | 3.0 | 0.2 | | 20.0 | |
| 43 | | | | | 0.2 | 20.0 | |
| 44 | | | | | 0.2 | 20.0 | |
| 45 | 4.0 | | | 0.2 | | 20.0 | |
| 46 | | 7.0 | | 0.2 | | 20.0 | |
| 47 | 7.0 | | | | 0.2 | 20.0 | |
| 48 | | | | 0.2 | | 20.0 | |
| 49 | 2.0 | | | 0.2 | | | 24.0 |
| 50 | | 3.0 | 3.0 | 0.2 | | | 24.0 |
| 51 | | | | 0.1 | | | 24.0 |
| 52 | | | 2.0 | | 0.2 | | 24.0 |
| 53 | | | | | 0.2 | | 24.0 |

Application Example A

A small cheese of 40 g and a density of 0.41 g/cm³ (=density of package as put into the dyeing machine) is wound using a polyester yarn (dtex 167f) and a precision winder. This cheese is dyed with the below-mentioned dyes in a liquor circulation machine (for example Colorstar from Zeltex AG, Switzerland). The liquor:yarn ratio is 10:1, the water hardness is 11°dH (German degrees of hardness). The dyes used are:

0.19% of C.I. Disperse Yellow 86
0.185% of C.I. Disperse Yellow 42
0.122% of C.I. Disperse Red 91
0.05% of C.I. Disperse Blue 56
0.44% of C.I. Disperse Blue 77

3.5% of the dispersion according to Example 32 are added. The pH is 5.5 (set with formic acid/ammonium sulphate). The 40° C. liquor is poured onto the package, the liquor circulation pump is started, and the liquor, which circulates at a pressure of 2 bar, is heated from 40° C. to 70° C. at a rate of 3° C./min and then from 70° C. to 130° C. at a rate of 1° C./min. Dyeing is continued at 130° C. fpr 30 minutes, and the batch is then cooled down from 130 to 70° C. at a rate of 5° C./minute. This is followed by washing, reduction clearing, another wash and finally drying. During the entire dyeing time, there is no pressure build-up between the inside and outside of the cheese. The dyeing obtained is level and there are no discernible dye deposits on the dyed package or on a knit produced therefrom.

In an analogous way as the dispersion of Example 32 the dispersions of each of Examples 33 to 53 are employed in Application Example A. During the entire dyeing time, there is no pressure build-up between the inside and the outside of the packages. The dyeings obtained are level and there are no discernible dye deposits on the dyed packages or on knits produced therefrom.

Application Example B

A polyester/cotton blend fabric is padded with an aqueous brightening liquor containing 0.8 to 4 g/l of the dispersion according to Example 1 and 0.2 g/l of the adduct of 6 mol of ethylene oxide to 1 mol of tridecyl alcohol to a wet pick-up of 70% based on the weight of the dry substrate, then predried for 2 minutes at 130° C. and thermosoled for 30 minutes at 180° C. By this the polyester portion of the blend fabric is satisfactorily optically brightened.

The cotton portion can then, in a second process step, in a manner conventional per se, under alkaline conditions, be simultaneously optically brightened with an optical brightener of the bistriazinylamino-stilbenedisulphonic acid series and bleached with hydrogen peroxide in the presence of a peroxide bleach liquor stabilizer (wet pick-up 70%, 90 minutes' hot dwell at 95° C., then hot and cold rinse and finally drying).

A satisfactory optical brightening is obtained.

In an analogous way as the dispersion of Example 3 the dispersions of each of Examples 2 to 31 are employed in Application Example B. Satisfactory optical brightenings are obtained.

Application Example C

[Optical Brightening of Polyester in Jet Dyeing Machine (Rotostream Thies)]

Polyester fabric is optically brightened in a jet at a liquor/substrate ratio of 5:1 to 10:1 with an aqueous liquor containing (based on the substrate) 0.1–1.5% of the dispersion of Example 2 and 0.5% of condensation product of naphthalenesulphonic acid and formaldehyde 5/4 (as sodium salt), pH 5.5 (set with acetic acid) using the following temperature profile: 30 minutes' heating from 40 to 130° C., treating at 130° C. for 30 minutes, thereafter hot rinse, then cooling, unloading and drying. This provides very uniform optical brightenings.

Application Example D

A polyester fabric is padded with an aqueous brightening liquor containing 2 to 15 g/l of the dispersion of Example 2 and 0.2 g/l of the adduct of 6 mol of ethylene oxide to 1 mol of tridecyl alcohol, up to a wet pick-up of 80% based on the weight of the dry substrate, then predried at 130° C. for 2 minutes and thennosoled at 170° C. for 30 seconds. The polyester fabric is satisfactorily optically brightened.

In an analogous way as the dispersion of Example 2 the dispersions of each of Examples 1 or 3 to 31 are employed in Application Examples C and D. Satisfactorily optically brightened polyester fabrics arc obtained in each case.

What is claimed is:

1. An aqueous flowable dispersion, having a viscosity of less than 1000mPas. (U) containing:
   (A) a UV-light-absorbing textile treatment agent and
   (B) a dispersant system containing
      ($B_X$) a non-ionogenic polymeric hydrophilic dispersant containing a polymeric lipophilic base structure and hydrophilic polyethylene glycol ether chains or a mixture of such dispersants and
      ($B_Y$) a non-ionogenic or anionic vinyl-polymeric hydrophilic thickener or a mixture of such thickeners.

2. An aqueous dispersion (U) according to claim 1, wherein (A) is a UV-absorber or a disperse optical brightener.

3. An aqueous dispersion (U) according to claim 1, wherein $(B_X)$ is a polyethylene glycol ether polycondensate of at least one phenolic compound with formaldehyde to form corresponding novolaks wherein the polyethylene glycol ether chains are optionally partly or wholly capped by alkylation.

4. An aqueous dispersion (U) according to claim 1, wherein (B) in addition to $(B_X)$ and $(B_Y)$, contains $(B_Z)$ at least one non-iongenic or anionic surfactant other than $(B_X)$ and $(B_W)$ at least one dispersing auxiliary other than $(B_Y)$.

5. An aqueous dispersion (U) according to claim 1, wherein $(B_Y)$ is $(B_{Y1})$ a carboxyl-containing crosslinked copolymer, $(B_{Y2})$ a non-ionogenic (co)polymer essentially free from hydrogen bonded to hetero atoms or $(B_{Y3})$ a polyvinyl alcohol or a mixture of two or more thereof.

6. An aqueous dispersion (U) according to claim 1, additionally containing (D) at least one formulation additive, selected from the group of defoamers, fungi- or bacteriostatic substances, microbicides or dyes, and (E) at least one agent for setting the pH.

7. An aqueous dispersion (U) according to claim 1, essentially consisting of (A), (B) and water and optionally at least one of the components (D) and (E).

8. A process for the production of a dispersion (U) according to claim 1, characterized in that (A) is mixed with (B) and optionally with (D) and (E) in an aqueous medium.

9. A method of using the aqueous dispersions (U) according to claim 1 for treating textile material from an aqueous liquor comprising the steps of:

providing textile materials; and contacting said textile materials with said aqueous dispersion (U) according to claim 1.

10. A method of using according to claim 9, for treating synthetic or cellulosic textile material in cheese form.

11. The aqueous flowable dispersion (U) according to claim 1, where said viscosity is $\leq 300$ mPas.

12. The aqueous flowable dispersion (U) according to claim 1, where said viscosity is from 20 to 300 mPas.

* * * * *